United States Patent [19] [11] 4,384,901
Swoboda, III et al. [45] May 24, 1983

[54] METHOD AND APPARATUS FOR CUTTING AND BEVELING PIPE

[75] Inventors: John J. Swoboda, III, Victoria; Harvey Babb, Goliad, both of Tex.

[73] Assignee: Lame, Inc., Victoria, Tex.

[21] Appl. No.: 333,444

[22] Filed: Dec. 22, 1981

[51] Int. Cl.³ .............................................. B23K 7/04
[52] U.S. Cl. ..................................... 148/9.6; 266/54; 266/57
[58] Field of Search ...................... 266/54, 57; 148/9.6

[56] References Cited

U.S. PATENT DOCUMENTS

| | | | |
|---|---|---|---|
| 2,847,204 | 8/1958 | Menser et al. | 266/57 |
| 3,123,657 | 3/1964 | Clark, Jr. et al. | 266/59 |
| 3,469,068 | 9/1969 | Wall, Jr. | 219/125 |
| 3,555,239 | 1/1971 | Kerth | 219/125 |
| 3,772,949 | 11/1973 | Pavone et al. | 83/56 |
| 3,900,346 | 8/1975 | Muller et al. | 148/9.6 |
| 3,934,861 | 1/1976 | Rahall | 148/9 R |
| 3,936,714 | 2/1976 | Marshall et al. | 318/576 |
| 4,014,495 | 3/1977 | Oda et al. | 228/7 |
| 4,014,528 | 3/1977 | Sugiyama et al. | 266/66 |
| 4,052,039 | 10/1977 | Koyano et al. | 266/57 |
| 4,135,701 | 1/1979 | Light, Jr. et al. | 266/57 |
| 4,143,862 | 3/1979 | Krieg | 266/56 |
| 4,148,467 | 4/1979 | Sargeant | 266/57 |
| 4,168,056 | 9/1979 | Haley | 266/58 |
| 4,216,945 | 8/1980 | Krieg | 266/56 |
| 4,219,370 | 8/1980 | Hoaglin et al. | 148/9.6 |

Primary Examiner—W. Stallard
Attorney, Agent, or Firm—Jerry W. Mills

[57] ABSTRACT

A method and apparatus for cutting a pipe. A pipe is positioned on a plurality of support rollers for rotating the pipe. A cutting torch, mounted on a telescoping arm, is movable along the longitudinal axis of the pipe. The angle that the cutting torch makes with the surface of the pipe is varied by rotating the cutting torch along an arcuate path that is in a plane parallel and perpendicular to the longitudinal axis of the pipe. The cutting torch is directed towards the radial center of the arcuate path that is on the surface of the pipe. Servo motors selectively vary the rotational angle of the pipe, the position of the cutting torch and the angle of the cutting torch. A computer automatically controls the operation of the servo motors with the aid of a pre-programmed mathematical function. The mathematical function uses characteristic data for the pipe and feedback data from the servo motors.

40 Claims, 7 Drawing Figures

METHOD AND APPARATUS FOR CUTTING AND BEVELING PIPE

TECHNICAL FIELD

This invention relates to automatic pipe cutting apparatus and more particularly to an apparatus that automatically makes a mitered cut on a pipe and forms a constant angle bevel on the mitered cut in one operation.

BACKGROUND OF THE INVENTION

To automatically weld two pieces of pipe together at a joint requires that the bevel of the joint be uniform. When the pipe is cut at 90° to its longitudinal axis, the production of bevels at a constant angle is relatively simple. However, when the pipe is cut at an angle to form a mitered joint of, for example, 45°, the bevel must be uniform to produce a uniform groove for welding and the angle at which the bevel is cut must vary, since the mitered cut follows an eliptical path over the surface of the the pipe. The manner in which this bevel varies is defined by a complicated set of trigonometric equations.

There are many known devices in the prior art for cutting pipes and the like at the desired angle of cut and at different angles with selected bevels. For example, U.S. Pat. No. 4,143,862 and U.S. Pat. No. 4,216,945 both show an apparatus for automatically cutting a mitered cut at a varying angle of bevel by rotating the torch and driving mechanism around the pipe. A combination of two servo motors positions the cutting torch at a selected point on the surface of the pipe while an additional two servo motors set the angle that the torch makes with the surface of the pipe. A profile of the desired cut is required to be cut and attached to the pipe which, through the use of optical sensing devices, provides positional information to the servo motors. The mathematical equations defining the bevel angle are translated onto this profile in the form of a curve. This is a tedious process since each pipe needs a separate profile and, in addition, the profile must be applied to the surface of the pipe with due care.

The mathematical equations provide a mathematical relationship between the desired cut and the four controlling servo motors. The equations also take into consideration operator error in applying the profile since there is no feedback between the profile and actual cut. In addition, there is no provision for mating pipes of differing thicknesses.

A need has thus arisen for a mitered cutting system which utilizes a minimum number of servo motors to position the torch about the pipe and a method for accurately controlling the cutting operation. To accurately control the cutting operation, a comparison of the actual and desired cut is preferred in order to maintain a high level of quality control. The various characteristics defining any two intersecting pipes, such as the inner diameter and outer diameter of the pipes and the intersection angle thereof, need to be readily changable to accommodate a manufacturing environment.

SUMMARY OF THE INVENTION

The present invention disclosed and claimed herein includes a method and system for cutting a pipe. A pipe is initially positioned on a rotatable support and is held in place by a retaining member extending around and above the pipe to exert a downward force on the pipe. A positioning apparatus is attached to the retaining member to provide movement along the longitudinal axis of the pipe. A rotating bracket is positioned on the end of the positioning apparatus in a plane that is perpendicular and parallel to the pipe. The rotating bracket can be positioned along the longitudinal axis of the pipe by the positioning apparatus. The rotating bracket traverses an arcuate path having the radial center directed toward the surface of the pipe. A cutting torch is mounted on the rotating bracket in the same plane as the rotating bracket and directed toward the radial center of the rotating bracket. The pipe is rotated on the rotatable support while the positioning apparatus urges the rotating bracket along a path parallel to the pipe and the rotating bracket varies the angle that the cutting torch makes with the surface of the pipe.

The operation of cutting the pipe is controlled by a computer. Characteristic data is input on a data input panel for each set of intersecting pipes. This data is then inserted into stored equations that calculate the desired cutting path that the cutting torch traverses. The cutting torch is initially positioned by a manual control panel that overrides the computer and inputs the initial coordinates to the computer.

In another aspect of the present invention, the longitudinal and angular position of the cutting torch and the rotational position of the pipe are continually fed back to the computer. The computer continually checks the expected values for the desired cutting path with the actual values and makes an adjustment accordingly.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
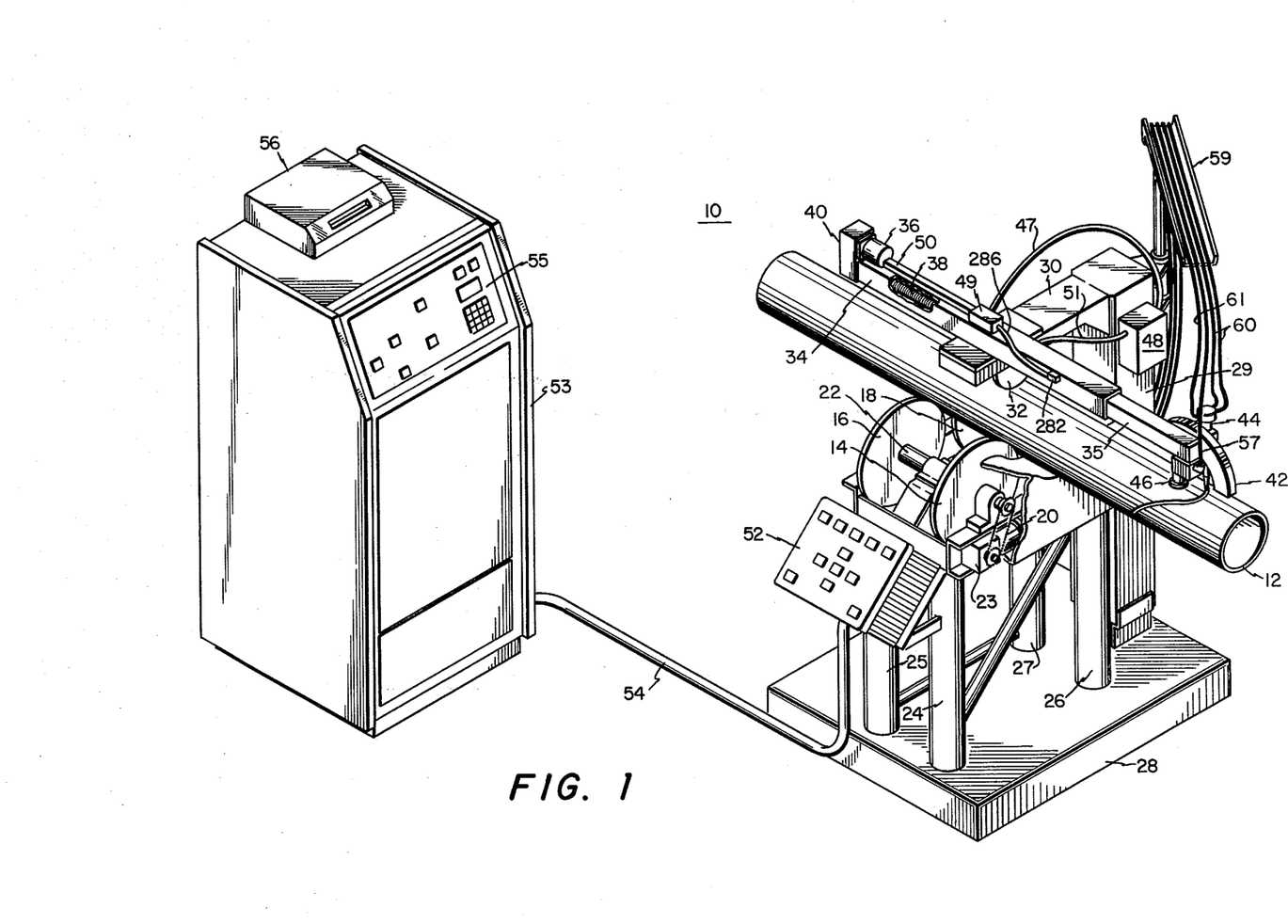
FIG. 1 is a perspective view of the present invention.

Referring to FIG. 1, there is shown a perspective view of a pipe beveling machine 10 of the present invention. The pipe 12 to be processed is shown as being supported for rotation about its longitudinal axis by four support rollers, three of which 14, 16 and 18 are shown and a fourth roller (not shown) is aligned and parallel to roller 18. The support roller 14 is connected to the support roller 16 by an axle 22. A variable speed motor 23 rotates the front support roller 14 through a drive chain 20. The support roller 16 and the axle 22 are rotatable with roller 14. Roller 18 and the fourth roller are not directly driven but freely rotate to enable rotation at the pipe 12.

The rollers 14, 16, 18 and the fourth roller are supported on four vertical legs 24, 25, 26, and 27. The vertical legs 24, 25, 26, and 27 are supported on a base 28. The combination of the base 28, the vertical legs 24, 25, 26 and 27, and the support rollers 14, 16, 18 and the fourth roller provide a very stable rotatable support for the pipe.

A vertical telescoping arm 29 supports a horizontal roller bracket 30. A sensing roller 32 is attached to the end of the horizontal retaining bracket to measure the angular distance that the pipe 12 has traversed. Although the weight of the pipe 12 holds the pipe 12 onto the support rollers 14, 16, 18 and the fourth roller, a small amount of slippage does not allow measurement therewith. The sensing roller 32 provides a more accurate determination of the angular distance traversed by the pipe 12.

The vertical telescoping arm 29 is operable to clamp the pipe 12 into place through the use of hydraulics (not shown). When a downward force is exerted by the hydraulic system the vertical telescoping arm 29 lowers the sensing roller 32 onto the surface of the pipe 12. When the cutting operation is completed the hydraulic system raises the vertical telescoping arm 29 and the pipe 12 can be removed.

A horizontal telescoping arm 34 is rigidly attached to the end of the horizontal roller bracket 30 above and parallel to the longitudinal axis of the pipe 12 and a sliding arm 35 comprises the movable portion thereof. A stepping motor 36 is attached to the end of the horizontal telescoping arm 34 and is connected to a ball screw 38 through a gear reduction box 40. The ball screw 38 urges the sliding arm 35 of the horizontal telescoping arm 34 in a horizontal path parallel to the longitudinal axis of the pipe 12.

A rotating bracket 42 is attached to the end of the sliding arm 35. A cutting torch 44 is attached to the rotating bracket 42. The rotating bracket 42 rotates the cutting torch 44 in a plane parallel and perpendicular to the longitudinal axis of the pipe 12. The rotational motion of the rotational bracket 42 is supplied by a stepping motor 46 attached to the sliding arm 35. Control pulses are input to the stepping motors 36 and 46 to increment them in discrete steps in either a clockwise or a counterclockwise direction. Incorporated within each of the stepping motors 36 and 46 is a step indicator (not shown) that outputs a feedback pulse for each discrete step that the stepping motor has taken. This feedback pulse provides positive information about the number of steps that a stepping motor has incremented and the direction of rotation. This information is more useful than using the control pulses input to the stepping motor as an indicator since any motor failures or broken control lines are detected by the absence of feedback pulses.

An interconnecting cable 47 connects a junction box 48 and a junction box 49 together. An interconnecting cable 50 connects the stepping motor 36 to the junction box 49. Control pulses to the stepping motor 36 and feedback pulses from the stepping motor 36 are routed through the interconnecting cables 47 and 50 and the junction box 49 to the junction box 48.

A feedback cable 51 is connected between the sensing roller 32 and the junction box 48. The sensing roller 32 outputs the angular distance the pipe 12 traverses on the feedback cable 51. Although not shown, the output of the junction box 48 is routed through the vertical telescoping arm 29 to a manual control panel 52.

An interconnecting cable 57 is connected to the stepping motor 46 and supported on a rotating arm 59. The interconnecting cable 57 routes control pulses to the stepping motor 46 and carries feedback pulses from the stepping motor 46. Although not shown, the interconnecting cable 57 is also connected to the manual control panel 52.

Control hoses 60 are connected to the cutting torch 44 and supply low pressure oxygen and acetylene for preheating the cutting torch 44. The control hoses 60 are supported by the rotating arm 59 and connected to an external gas supply (not shown). A control hose 61 is connected to the cutting torch 44 and is supported by the rotating arm 59. Control hose 61 supplies high pressure oxygen for the cutting operation. The gas supplied by the control hoses 60 and 61 is controlled by solenoids (not shown) and is described below.

The manual control panel 52 allows an operator to manually position the cutting torch 44 to a selected position on the pipe 12. The function of the control panel 52 is described in more detail below.

The manual control panel 52 is connected to a computer 53 through an interconnect cable 54. The computer 53 automatically controls the cutting operation of the pipe 12. Initial data for the cutting operation is input on the data panel 55, the operation of which is described in more detail below.

A data input device 56 is mounted on top of the computer 53 and is used to input data into the computer 53 and to store data input on the data panel 55 in a nonvolatile form. The data input device 56 can be a standard cassette deck or a floppy disk controller.

Figure 2:
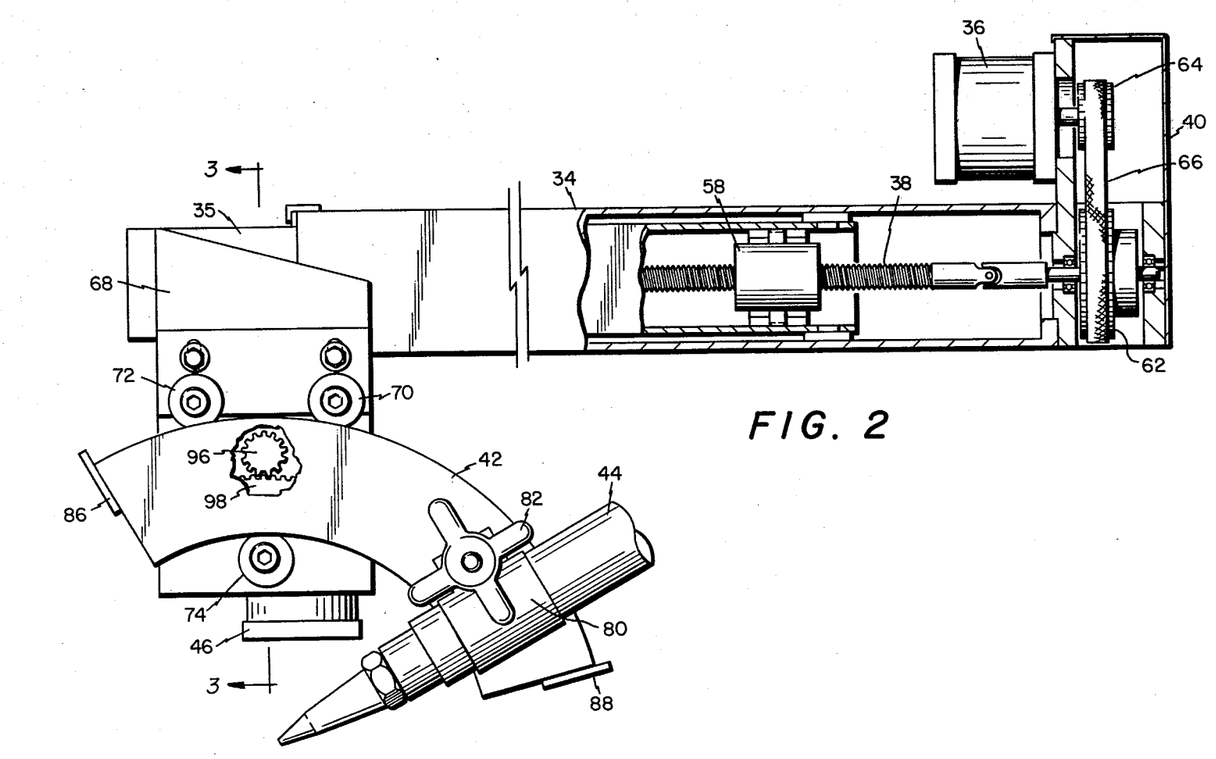
FIG. 2 is a side view of the telescoping arm for positioning the torch of the present invention.

Now referring to FIG. 2, there is shown a side view of the horizontal telescoping arm 34 with like numbers corresponding to like parts in the various drawings. The sliding arm 35 of the horizontal telescoping arm 34 is connected to an interior ball nut 58 that is threadedly engaged with the ball screw 38. The ball screw 38 is attached at one end to a driven pulley 62 in the gear reduction housing 40. The stepping motor 36 is attached to a drive pulley 64 that is connected to the driven pulley 62 by a drive belt 66.

As the stepping motor 36 is energized, the drive pulley 64 rotates to translate its motion to the ball screw 38. The combination of the drive pulley 64 and the driven pulley 62 effectively reduces the turns ratio for the stepping motor 36. As the ball screw 38 rotates, it urges the ball nut 58 along a linear path, thereby urging the sliding arm 35 along the same linear path. The stepping motor 36 can reverse its motion thus retracting or extending the sliding arm 35.

A mounting bracket 68 is attached to the sliding arm 35 at or near the end thereof. Upper guide rollers 70 and 72 and a lower guide roller 74 are attached to the mounting bracket 68. The guide rollers 70, 72 and 74 receive the rotating bracket 42. The rotating bracket 42 rests on the lower guide roller 74 and is retained by the upper guide rollers 72 and 70.

An adjustable sleeve 80 is attached to one end of the rotating bracket 42. A knob 82 is provided to adjust the inner circumference of the adjustable sleeve 80. The cutting torch 44 is slidably mounted into the adjustable sleeve 80 and can be held firmly in place by tightening the knob 82.

Referring now to FIGS. 1 and 2, the operation of the rotating bracket 42 is explained in more detail. The cutting torch 44 is positioned such that it rotates with the rotating bracket 42. The rotating bracket 42 rotates along a path having its radial center directed toward the surface of the pipe 12. By mounting the cutting torch 44 along the radial center of the rotating bracket 42, the cutting torch 44 always intersects the surface of the pipe 12 at the radial center of the arcuate path. The adjustable sleeve 80 allows the tip of the cutting torch 44 to be positioned a specific distance from the surface of the pipe 12 to focus the cutting flame of the cutting torch 44 for an optimum cut. It should be understood that the radial center of the arcuate path can be positioned above or below the surface of the pipe 12.

The rotating bracket 42 has stops 86 and 88 on either end thereof. When the rotating bracket 42 is at one extreme, stop 88 contacts the surface of the pipe 12 before the stop 86 moves past the guide bearing 72, thus preventing the rotating bracket 42 from deviating off its arcuate path. On the other extreme the stop 86 contacts the surface of the pipe 12 before the stop 88 passes the guide bearing 70, thus providing a similar result.

The allowable range for the angle that the cutting torch 44 makes with the surface of the pipe 12 ranges from approximately 20° to 90° since a cutting angle of less than 22° is seldom encountered in a manufacturing environment. The normal angle for beveling a mitered cut ranges from 30° to 90° with respect to the surface of the pipe 12. It should be understood that the cutting torch 44 can be attached to the opposite side of the rotating bracket 42 to provide an angle ranging from 90° to 170° with respect to the surface of the pipe 12, although this is not useful in the present application.

Figure 3:
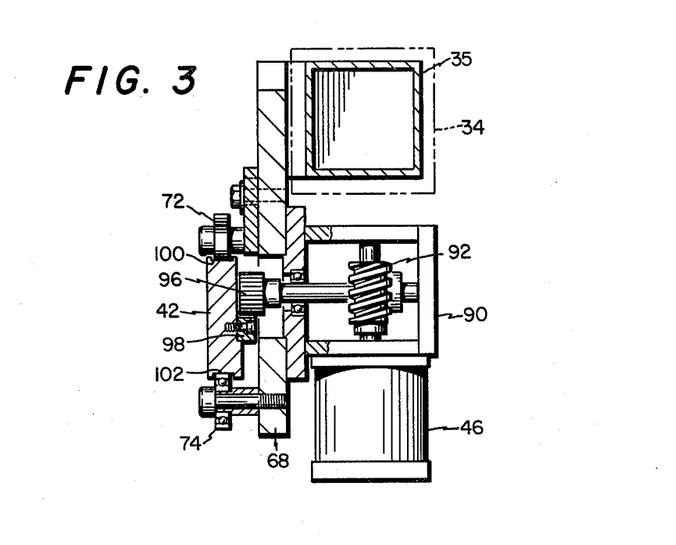
FIG. 3 is a cross sectional view taken along line 3—3 of FIG. 2.

Referring now to FIG. 3, there is shown a cross-sectional view of the rotating bracket 42 and the mounting plate 68 taken along line 3—3 of FIG. 2 with like numbers corresponding to like parts in the various Figures. A gear reduction box 90 is attached to the rear of the mounting plate 68 and houses a worm gear 92. The stepping motor 46 is attached to the lower end of the gear reduction housing 90 and drives the worm gear 92. The worm gear 92 translates the rotational motion of the stepping motor 46 to a drive gear 96 on the opposite side of the mounting plate 68 from the gear reduction box 90. The drive gear 96 engages a rack gear 98 that is attached to the rear portion of the rotating bracket 42. The rotating bracket 42 is held in place by the guide bearings 72 and 74 that ride in an upper groove 100 and a lower groove 102 on the rotating bracket 42. Although not shown, the guide roller 70 also rides in the groove 100. As the drive gear 96 rotates, the rotating bracket 42 is driven along an arcuate path by the rack gear 98, as shown in FIG. 2.

Now referring to FIGS. 1, 2 and 3, when the stepping motor 46 is energized the drive gear 96 rotates the rotating bracket 42 along an arcuate path. Since the cutting torch 44 is directed toward the radial center of the arcuate path, the cutting flame always intersects the surface of the pipe 12 at the same distance from the tip of the cutting torch 44. The temperature of the flame at the surface of the pipe 12 is adjusted by slidably moving the cutting torch 44 within the adjustable sleeve 80. When the rotating bracket 42 is traversed about the arcuate path, the flame temperature at the radial center of the arcuate path remains constant. This allows the angle that the cutting torch 44 makes with the surface of the pipe 12 to be controlled with one stepping motor 46 and yet maintain a constant cutting temperature on the surface of the pipe 12.

As the sliding arm 35 is traversed along the longitudinal axis of the pipe 12, the cutting flame of the cutting torch 44 is maintained at a constant temperature regardless of the position or the angle of the cutting torch 44.

It should be understood that the stepping motors 36 and 46 can be servo motors. There are some additional modifications required to utilize servo motors but these modifications are well known and easily implemented.

Figure 4:
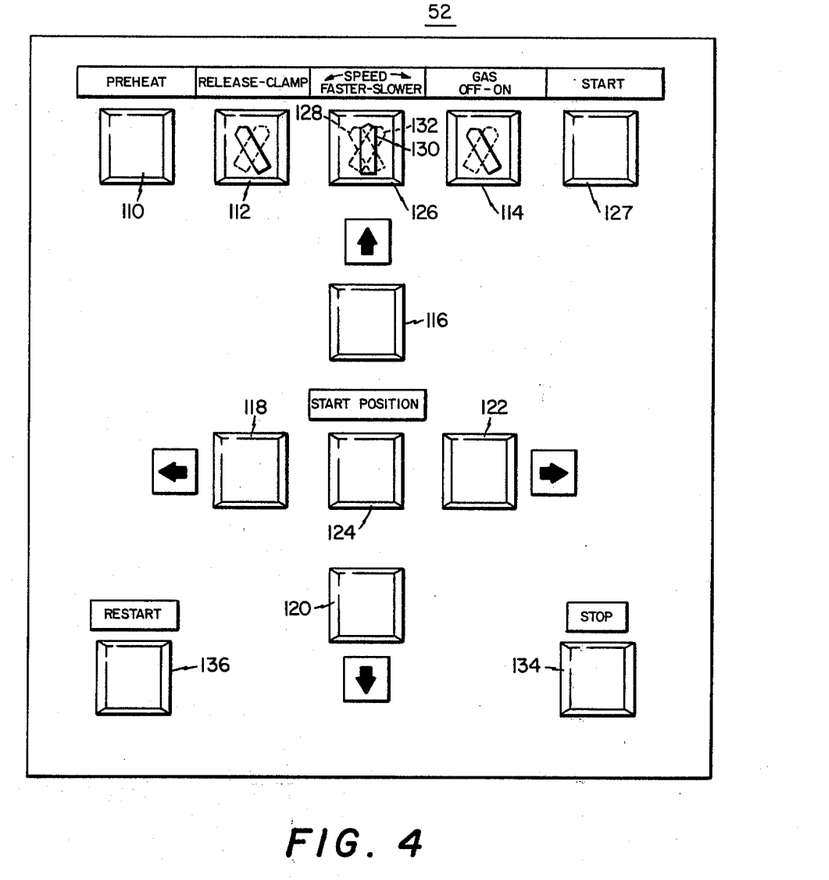
FIG. 4 is a planar view of the manual control panel.

Now referring to FIG. 4, there is shown a planar view of the manual control panel 52. In describing the function of the control panel 52, additional reference to FIG. 1 is required since the control panel 52 is operable to manually control the pipe cutting operation.

A toggle switch 110 turns on the preheat gas to the cutting torch 44. The preheat gas is a combination of low pressure oxygen and acetylene that allows the tip of the torch to heat to about 2500° C. A two-position switch 112 is operable in one position to lower the vertical telescoping arm 29 and clamp the pipe 12 to the support rollers 14, 16, 18 and the fourth roller. In the other position, switch 112 is operable to raise the vertical telescoping arm 29 and release the pipe 12. This operation permits the removal and/or replacement of the pipe 12 with another pipe. A switch 114 is operable to manually turn off the gas to the control hoses 60 and 61. The gas is always turned off by the operator when not actually cutting or preheating.

A series of four momentary switches 116, 118, 120 and 122 are operable to orient both the pipe 12 and the cutting torch 44 to a desired starting point. The switch 116 rotates the pipe 12 away from the operator. The switch 120 rotates the pipe 12 towards the operator. Switches 116 and 120 manually control the operation of the variable speed motor 26. The switch 118 is operable to retract the sliding arm 35 to move the cutting torch 44 to the operator's left. The switch 122 is operable to extend the sliding arm 35 to move the cutting torch 44 to the operator's right. Switches 118 and 122 manually control the operation of the stepping motor 36.

A momentary start switch 124 is operable to lock the present coordinates into the computer 53 and define them as the starting point. The operation of the starting coordinates is discussed in more detail below.

A toggle switch 127 is operable to turn on the oxygen in the control hose 56 and initiate the cutting operation. This increases the flow of oxygen to the torch 44. Once the switch 127 is depressed the cutting operation is automatically controlled by the computer 53.

A three-position switch 126, having positions 128, 130 and 132, provides two functions. First, when the computer 53 has control of the system 10, switch 126 is operable to adjust the cutting speed or the speed at which the cutting torch 44 traverses the surface of the pipe 12. In position 130, the pipe 12 initially rotates at a preset nominal speed. When the switch 126 is moved to position 128 the rotational speed of the pipe 12 increases. When released, the switch 126 automatically returns to position 130 and maintains the speed attained in position 128. When the switch 126 is in position 132 the rotational speed of the pipe decreases. When released, the switch 126 returns to position 130 and maintains the speed attained in position 132. Second, when the computer 53 does not have control of the cutting operation, and the system 10 is under manual control, switch 126 is operable to control the angle of the cutting torch 44. Position 128 increases the angle and position 132 decreases the angle. Switch 126 adjusts the angle of the cutting torch 44 in a manner similar to the adjustment of the rotational speed of the pipe 12 during the cutting operation as described above.

A momentary switch 134 is operable to override the computer 53 and stop the cutting operation. A momentary switch 136 is operable to restart the cutting operation without resetting the coordinates. Switches 134 and 136 allow momentary interruption of the cutting operation without loss of continuity.

Figure 5:
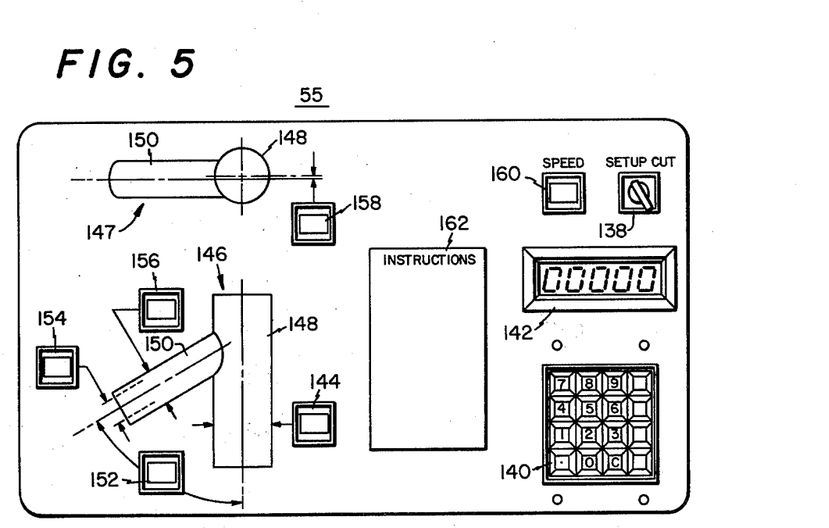
FIG. 5 is a planar view of the data input panel.

Now referring to FIG. 5, there is shown a planar view of the data input panel 55 of FIG. 1. A control switch 138, having a "set-up" position and a "cut" position, is operable to either input data in the "set-up" position or ready the computer 53 for the cutting operation in the "cut" position. A numerical keypad 140 is operable to key in a selected numerical value. The numerical value input to the keypad 140 is displayed on a display 142. After each selected value is input to the keypad 140, it is stored in the computer 53 by depressing selected switches that define specific functions. The function of these switches is contained in the following description.

Two schematics 146 and 147, showing a typical intersection of two pipes, are superimposed on the surface of the data panel 55 to aid the operator in putting the correct data in. The schematic 146 depicts a main pipe 148 connected to an intersecting pipe 150. A momentary switch 144 is operable to transfer data keyed into the keypad 140 to the computer 53 to indicate the outer diameter of the main pipe. A momentary switch 152 is operable to tranfer data keyed into the keypad 140 to storage to indicate the angle of intersection of the pipes. A momentary switch 154 is operable to transfer data keyed into the keypad 140 to storage to indicate the inner diameter of the intersecting pipe 148. A momentary switch 156 is operable to transfer data keyed into the keypad 140 to storage to indicate the outer diameter of the intersecting pipe 150. A momentary switch 158 is operable to transfer data keyed into the keypad 140 to storage to indicate the offset distance of the center lines of the intersecting pipe 150 and the main pipe 148. A momentary switch 160 is operable to transfer the data keyed into the keypad 140 to storage to indicate the initial cutting speed. As described above, the cutting speed can be increased or decreased during the cutting operation by the switch 126 on the control panel 52 of FIG. 4. An instruction sheet 162 is provided on the surface of the data panel 55 to aid the operator in entering data.

When data input is initially begun by switching the switch 138 to the "set-up" position, a blinking light behind one of the switches 144, 152, 154, 156, 158, and 160 turns on to indicate to the operator what data is necessary. After a specific bit of data is input to the keypad 140 corresponding to the momentary switch that is blinking, the blinking switch is depressed. This operation transfers the data to storage within the computer 53 and then the next momentary switch starts blinking, indicating that the computer 53 is ready for more data. This procedure continues until all data has been entered and then the switch 138 is placed in the "cut" position. The computer 53 is then ready for the coordinates to be zeroed and the start switch 124 on the control panel 52 to be depressed, as described above with reference to FIG. 4.

Figure 6:
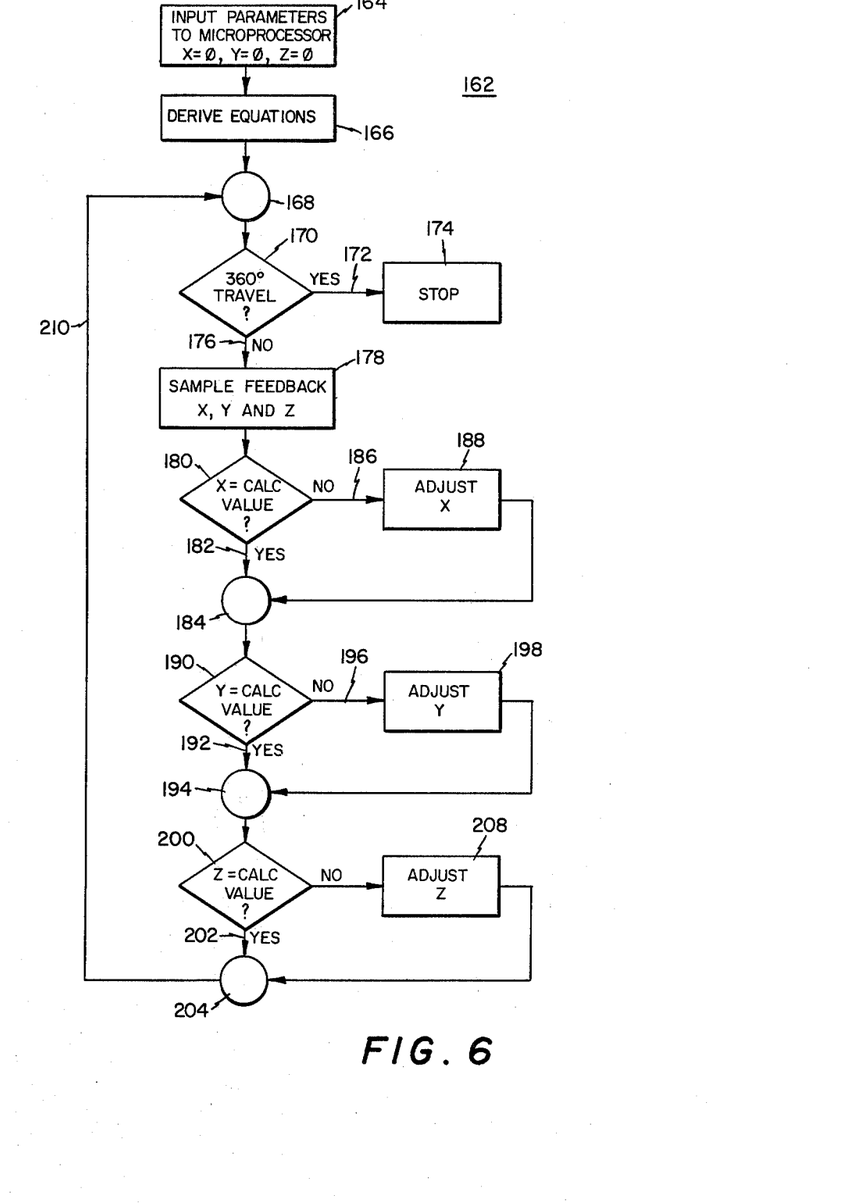
FIG. 6 is a flow chart for the cutting operation of the present invention.

Referring now to FIG. 6, there is shown a flow chart 162 for the pipe cutting operation that is controlled by the computer 53 and the control panel 52 of FIG. 1. All the components of FIGS. 1 through 5 are also incorporated within this description.

A block 164 indicates a step whereby parameters indicating the desired cut are input to the computer 53 through the data panel 55. The pipe 12 and the torch 44 are positioned and the coordinates zeroed. The computer 53 calculates the desired cut from these input parameters for three variables X, Y and Z where:

X = Pipe Rotation
Y = Torch Travel
Z = Torch Tilt Angle

The variable X is a function of the position of the torch 44 along the longitudinal axis of the pipe 12. The position of the torch 44 is sensed by the feedback pulses received from the stepping motor 36 along the interconnecting cable 47. Once the position of the torch 44 is determined, then X is calculated.

The variable Y is the torch travel and is a function of the position of the torch and the rotational speed of the pipe. The position of the torch 44 is determined from feedback, as described above, and the rotational speed is determined by the feedback signal from the sensing roller 32 that is routed along the feedback cable 51. Once this information has been received, the correct value of Y can be calculated. It should be understood that the cutting speed and the rotational speed are not necessarily equal. For example, when the cutting torch 44 is cutting a sharp mitre cut, the cutting speed is constant and the rotational speed decreases. The rotational speed varies to allow a uniform cut regardless of mitre angle.

The variable Z is a function of both X and Y. After determining the position of the torch 44, the position of the pipe 12 rotates and the proper tilt is applied to the torch 44. The variables X, Y and Z are all set equal to zero when the cutting operation begins. The flow chart 162 then proceeds to a function block 166.

The function block 166 indicates the step whereby the equations for the desired cut are derived from the input data and X, Y and Z are set equal to zero and inserted into these equations. Although these are complicated equations they are easily performed. The first equation is the one defining the variable X which is a function of Y. Depending upon the position and the cutting speed of the torch 44, the value of Y can be determined and inserted into the equation, thus providing a value for X. The second equation is the one for the variable Z. Once X and Y are determined they are inserted into the equation and the value of Z is determined. After the equations are derived the flow chart 162 is proceeds to an intersection block 168.

The next block is a decision block 170 that receives the feedback information about the distance traveled around the outer circumference of the pipe and calculates the angle of rotation from the outer diameter that was input in block 164. This feedback provides an accurate record to determine the exact position of the cutting torch 44.

If the pipe 12 has traversed a 360° angle, the flow chart 162 then proceeds along a YES path 172 to a function block 174, labeled STOP, and the cutting operation terminates. If a 360° angle has not been traversed, then the flow chart 162 proceeds along a NO path 176 to a function block 178. The function block 178 samples the present status of the three variables X, Y and Z that are returned to the computer 53 as feedback signals. This information is stored within the computer 53 for later use.

The flow chart 162 then proceeds to a decision block 180 that determines if X is equal to the correct value. By sampling the value of X and Y in block 178 the actual value of X can be compared to the expected value of X as calculated from the equation derived in block 166. If X is equal to the expected value, then the flow chart 162 proceeds along a YES path 182 to an intersection block 184. If X is not equal to the desired value, then the flow chart 162 proceeds along a NO path 186 to a function block 188.

The function block 188 indicates the step whereby the speed of rotation for the pipe 12 is increased or decreased depending upon the position of the cutting torch 44 on the surface of the pipe 12. When the desired position is achieved, the flow chart 162 proceeds to the intersection block 184 and then to a decision block 190.

The decision block 190 compares the actual value of Y from block 178 to the expected value of Y as calculated from the equation derived in block 166. The desired value of Y is a function of the cutting speed of the torch 44 and the position of the pipe 12 and the torch 44. If the torch 44 is correctly positioned, the flow chart 162 will proceed along a YES path 192 to an intersection block 194. If Y is not equal to the desired value, then the flow chart 162 proceeds along a NO path 196 to a function block 198.

The function block 198 indicates a step whereby the position of the torch 44 and/or the speed with which the torch 44 travels along the longitudinal axis of the pipe 12 is adjusted to achieve the correct value of Y. When the correct value of Y is achieved, the flow chart 162 proceeds to the intersection block 194 and to a decision block 200.

The decision block 200 compares the actual value of Z from block 178 with the expected value of Z as calculated from the equation derived in block 166. If Z is equal to the correct value, then the flow chart 162 proceeds along a YES path 202 to an intersection block 204. If Z is not equal to the desired value, then the flow chart 162 proceeds along a NO path 206 to a function block 208.

The function block 208 indicates a step whereby the angle of tilt for the torch 44 is adjusted to the correct value using the equation generated by block 166. The angle of the torch 44 is adjusted until the correct value is obtained and then the flow chart 162 proceeds to the intersection block 204.

After the variables X, Y and Z have been adjusted to equal the respective calculated values, the flow chart 162 proceeds along a feedback path 210 to the intersection block 168, thus completing one full loop. The flow chart 162 then proceeds back to the decision block 170 to determine if a 360° angle has been traversed. Until the variable speed motor 23 has rotated the pipe 12 360°, the flow chart 162 continues along the NO path 176 until a 360° angle has been traversed by the pipe 12. When the pipe has traversed a 360° angle, the flow chart 162 is routed along the YES path 172 to the function block 174 and the cutting operation is terminated.

Figure 7:
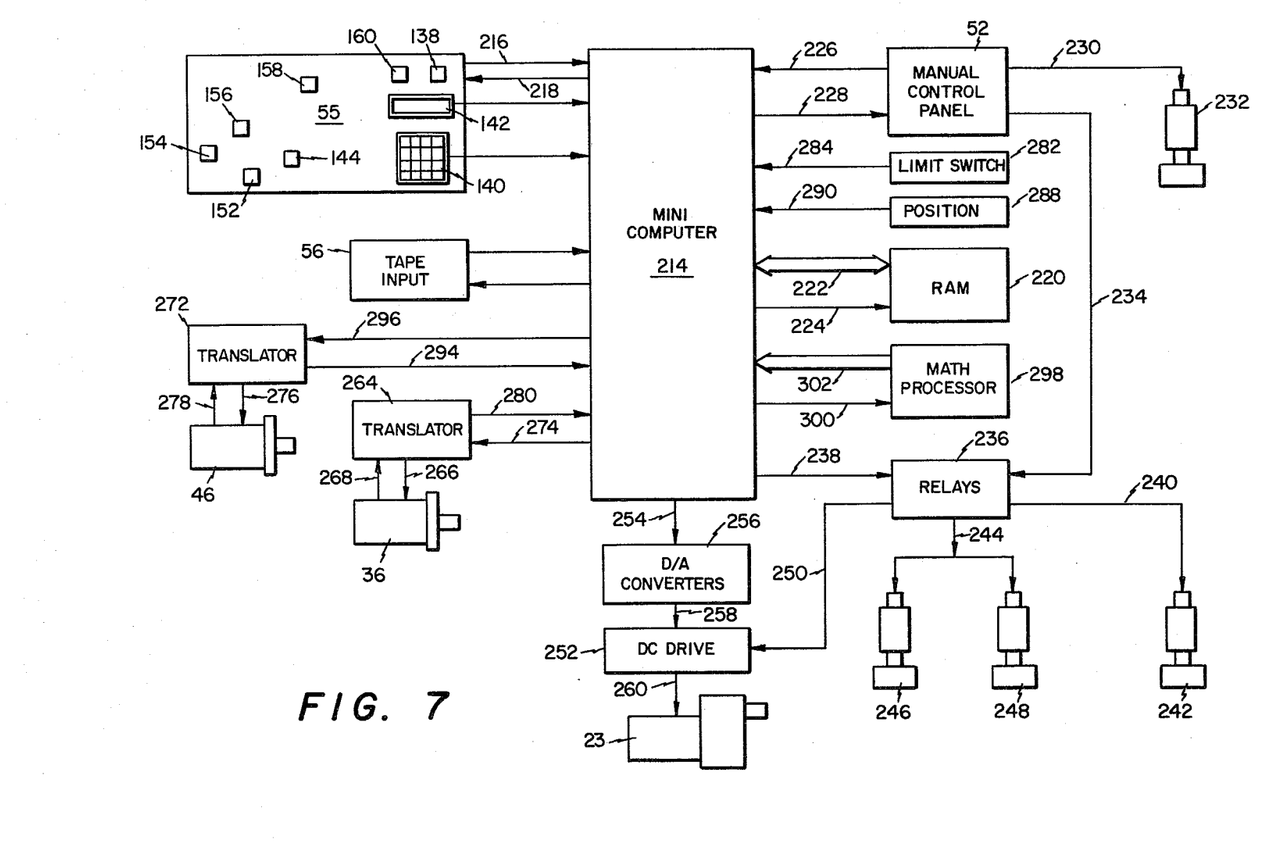
FIG. 7 is a schematic block diagram for the computer of the present invention.

Now referring to FIG. 7, there is shown a schematic diagram of the computer 53 of FIG. 1 and the peripheral equipment that it controls. The numerals correspond to like parts in the various FIGURES. Data is input through the keyboard 140 of the data panel 55 to a minicomputer 214. The data that is input to the minicomputer 214 is output to the display 142 on the data panel 55.

The momentary switches 144, 152, 154, 156, 158 and 160 are connected to one end of a data line 216. Data line 216 is connected at the other end thereof to the minicomputer 214. A control line 218 connects the minicomputer 214 to the blinking lights behind the set-up switches 144, 152, 154, 156, 158 and 160, as described above with reference to FIG. 5. The minicomputer 214 indicates, with a blinking light, which set-up switch is to be depressed. When the proper data switch is depressed the data on the dislay 142 is stored in a volatile memory 220. The volatile memory 220 is a random access memory (RAM). The volatile memory 220 communicates with the minicomputer 214 along a data bus 222. A control line 224 is connected between the volatile memory 220 and the minicomputer 214 for controlling the volatile memory 220.

A data line 226 connects the manual control panel 52 to the minicomputer 214. A control line 230 connects the control panel to a clamp/release solenoid valve 232. The clamp/release solenoid valve 232 is operable to raise and lower the vertical telescoping arm 29.

A control line 234 connects the control box 52 to a bank of relays 236. The bank of relays 236 is connected to the minicomputer 214 by a control line 238. A control line 240 connects the bank of relays 236 to a high pressure oxygen solenoid valve 242 that provides the oxygen for the cutting operation. A control line 244 connects the bank of relays 236 to the preheat solenoid valves 246 and 248. The preheat solenoid valve 246 supplies the acetylene gas to the cutting torch 44 of FIG. 1 and the preheat solenoid valve 248 supplies the low pressure oxygen for the cutting torch 44. A control line 250 connects the bank of relays 236 to a motor driver 252. The bank of relays 236 allows the minicomputer 214 or the manual control panel 52 to operate the solenoids 242, 246 and 248.

A control line 254 connects the minicomputer 214 to the digital input of a Digital-to-Analog (D/A) converter 256. A control line 258 connects the analog output of the D/A converter 256 to the motor driver 252. A control line 260 connects the output of the motor driver 252 to the variable speed motor 23.

The D/A converter 256 transforms the digital output of the minicomputer 214 into an analog signal for controlling the motor driver 252. The bank of relays 236 provides a control signal on a control line 250 that turns the variable speed motor 23 in a forward or reverse direction. The bank of relays 236 outputs a signal on control line 250 in response to the manual control panel 52 only. This allows an operator to rotate the pipe forward or backward to zero the coordinates, as described above with reference to FIG. 4. When there is no signal on control line 250 the motor driver 252 is controlled by the minicomputer 214.

A control line 262 is connected between the minicomputer 214 and a translator 264. A control line 266 is connected between the translator 264 and the stepping motor 36. A feedback line 268 is connected between the stepping motor and the translator 264. A feedback line 270 is connected between the translator 264 and the minicomputer 214.

The translator 264 is operable to convert the output of the minicomputer 214 into the requisite pulse level to drive the stepping motor 36. In a similar manner the translator 264 converts the feedback pulses from the stepping motor 36 into a signal compatible with the minicomputer 214.

A translator 272 translates an outgoing signal from the minicomputer 214 on a control line 274 into a driving pulse on a control line 276 to control the stepping motor 46. Feedback pulses from the stepping motor 46 are input to the translator 272 on a feedback line 278. The translator 272 converts the feedback signal into a compatable signal for the minicomputer 214 and inputs it to the minicomputer 214 along a feedback line 280.

Referring now to FIG. 1 and FIG. 7, a limit switch 282 senses the extreme limit of the sliding arm 35. When the sliding arm 35 has reached its limit, a control signal is output by the limit switch 282 on a control line 284 and the minicomputer 214 inhibits further movement of the sliding arm 35. The control line 284 is contained within an interconnecting cable 286 that connects the limit switch 282 to the junction box 49.

The sensing roller 32 outputs the positional information of the pipe 12 as indicated by a block 288. The positional information is input to the minicomputer 214 on a data line 290.

The data input device 56 provides the computer 53 with the capability of inputting characteristic data of the pipe 12 without using the data input panel 55. The data from the tape input 56 is input to the minicomputer 214 on a data line 294. The minicomputer 214 can also store the information received from the data input panel 55 on the tape input 56. This provides the computer 53 with a nonvolatile memory. When storing data on the tape input 56, the data is output from the minicomputer 214 on a data line 296.

The internal program that defines the desired cutting path is calculated from equations that are stored in a math processor 298. To fetch the program from the math processor 298, a control signal is impressed upon a control line 300 and the program is output on a data bus 302. The minicomputer 214 utilizes the programs stored within the math processor 298 to perform the necessary calculations for the desired cut. The math processor 298 is a read only memory (ROM) that has a nonvolatile memory which cannot be erased. It should be understood that by substituting various ROMs for the math processor 298 different equations can be utilized. Also, an erasable programmable read only memory (EPROM) can be utilized to allow more versatility in initially programming the equations.

In the operation described above, the continual feedback of speed and position allow the computer 53 to provide an accurate miter and bevel angle. Once the parameters are input on the control panel 55, the computer 53 automatically cuts the pipe without requiring any manual adjustment. There is therefore realized, by the apparatus 10 of FIG. 1, a practical method for cutting and beveling pipe in a manufacturing environment.

Although a preferred embodiment of the invention has been described in detail it should be understood that various changes, substitutions and alterations can be made therein without departing from the spirit and scope of the invention as defined by the appended claims.

What is claimed is:

1. A method for cutting a pipe comprising:
   rotatably mounting the pipe;
   rotating the pipe;
   urging a longitudinal tool along a path parallel to the longitudinal axis of the pipe and spaced from the surface of the pipe;
   rotating the longitudinal tool along an arcuate path in a plane having axes parallel and perpendicular to the longitudinal axis of the pipe, the radial center of the arcuate path oriented towards the surface of the pipe, the longitudinal tool directed toward the radial center of the arcuate path and parallel to the radius of the arcuate path such that the longitudinal tool is directed toward the radial center of the arcuate path for all angles of rotation of the longitudinal tool;
   inputting characteristic data of the pipe and the desired cut; and
   automatically controlling the movement of the longitudinal tool and the pipe.

2. The method of claim 1 further comprising manually orienting the longitudinal tool to desired coordinates.

3. The method of claim 1 wherein the step of rotating the longitudinal tool comprises the step of rotating the longitudinal tool along an arcuate path in a plane parallel and perpendicular to the longitudinal axis of the pipe, the radial center of the arcuate path oriented on the surface of the pipe, the longitudinal tool directed toward the radial center of the arcuate path and parallel to the radius of the arcuate path.

4. The method in claim 1 wherein the step of inputting characteristic data comprises:
   keying in characteristic data of the pipe and the desired cut; and
   transferring data to a volatile storage.

5. The method in claim 1 further comprising sensing the movement of the longitudinal tool and the pipe.

6. A method for cutting a pipe comprising:
   rotatably mounting the pipe;
   rotating the pipe;
   sensing the rotational speed of the pipe;
   urging a longitudinal tool along a path parallel to the longitudinal axis of the pipe and spaced from the surface of the pipe;
   sensing the position of the longitudinal tool;
   rotating the longitudinal tool along an arcuate path in a plane parallel to and intersecting with the longitudinal axis of the pipe, the radial center of the arcuate path oriented towards the surface of the pipe, the longitudinal tool directed toward the radial center of the arcuate path and parallel to the radius of the arcuate path such that the longitudinal tool is directed toward the radial center of the arcuate path for all angles of rotation of the longitudinal tool;
   sensing the angle of rotation of the longitudinal tool;
   inputting characteristic data of the pipe and the desired cut;
   calculating the desired cutting path; and
   automatically controlling the movement of the longitudinal tool and the pipe along the calculated path.

7. The method of claim 6 further comprising manually orienting the longitudinal tool and the pipe to desired coordinates before the step of automatically controlling the movement of the longitudinal tool and the pipe.

8. The method of claim 6 wherein the step of inputting characteristic data comprises:
   keying in characteristic data of the pipe and the desired cut, and
   transferring the data to volatile storage.

9. The method of claim 6 wherein the step of inputting characteristic data comprises inputting the characteristic data from nonvolatile storage to volatile storage.

10. An apparatus for cutting a pipe comprising:
    means for rotatably mounting said pipe;
    means for rotating said pipe;
    means for urging a longitudinal tool along a path parallel to the longitudinal axis of said pipe and spaced from the surface of said pipe;
    means for rotating said longitudinal tool along an arcuate path in a plane having axes parallel and perpendicular to the longitudinal axis of said pipe, the radial center of the arcuate path oriented towards the surface of said pipe, said longitudinal tool directed toward the radial center of the arcuate path and parallel to the radius of the arcuate path such that said longitudinal tool is directed toward the radial center of the arcuate path for all angles of rotation of said longitudinal tool;

means for inputting characteristic data of said pipe and the desired cut; and means for automatically controlling the movement of said longitudinal tool and the pipe.

11. The apparatus of claim 10 further comprising means for manually orienting said longitudinal tool to desired coordinates.

12. The apparatus of claim 10 wherein said means for rotating said longitudinal tool comprises means for rotating said longitudinal tool along an arcuate path in a plane parallel and perpendicular to the longitudinal axis of said pipe, the radial center of the arcuate path oriented on the surface of said pipe, said longitudinal tool directed toward the radial center of the arcuate path and parallel to the radius of the arcuate path.

13. The apparatus in claim 10 wherein said means for inputting characteristic data comprises:

a keypad for keying in characteristic data of said pipe and the desired cut; and transfer keys for transferring data to a volatile storage.

14. The apparatus in claim 10 further comprising means for sensing the movement of said longitudinal tool and said pipe.

15. An apparatus for cutting a pipe comprising:

means for rotatably mounting said pipe;

means for rotating said pipe;

means for sensing the rotational speed of said pipe;

means for urging a longitudinal tool along a path parallel to the longitudinal axis of said pipe and spaced from the surface of said pipe;

means for sensing the position of said longitudinal tool;

means for rotating said longitudinal tool along an arcuate path in a plane parallel to and intersecting with the longitudinal axis of said pipe, the radial center of the arcuate path oriented towards the surface of said pipe, said longitudinal tool directed toward the radial center of the arcuate path and parallel to the radius of the arcuate path such that said longitudinal tool is directed toward the radial center of the arcuate path for all angles of rotation of said longitudinal tool;

means for sensing the angle of rotation of said longitudinal tool;

means for inputting characteristic data of said pipe and the desired cut;

means for calculating the desired cutting path; and means for automatically controlling the movement of said longitudinal tool and said pipe along the calculated path.

16. The apparatus of claim 15 further comprising means for manually orienting said longitudinal tool and said pipe to desired coordinates.

17. The apparatus of claim 15 wherein said means for inputting characteristic data comprises:

a keypad for keying in characteristic data of said pipe and the desired cut, and transfer keys for transferring the data to volatile storage.

18. The apparatus of claim 15 wherein said means for inputting characteristic data comprises a means for inputting the characteristic data from nonvolatile storage to volatile storage.

19. An apparatus for cutting a pipe comprised of:

rotatable support means for supporting and rotating said pipe;

first driving means for rotating said support means;

positioning means operable to traverse a path parallel to the longitudinal axis of said pipe;

second driving means for manipulating said positioning means;

rotating means attached to said positioning means, said rotating means traversing an arcuate path in a plane having axes parallel and perpendicular to the longitudinal axis of said pipe, the radial center of said arcuate path oriented toward the surface of said pipe;

third driving means for rotating said rotating means;

cutting means attached to said rotating means, said cutting means in the same plane as said arcuate path, the operative end of said cutting means directed toward the radial center of said arcuate path;

input means for inputting characteristic data of said pipe and the desired cut; and controlling means for calculating the desired cutting path and cutting angle from the characteristic data and controlling said first, second and third driving means wherein said cutting means is continually positioned over the surface of said pipe along the desired cutting path and at selected angles to the surface of said pipe while said pipe is rotating.

20. The apparatus of claim 19 wherein said support means comprises a plurality of paired rotatable disks, said plurality of paired disks positioned along the longitudinal axis of said pipe, each of the plurality of paired disks adjacent to each other and in a plane that is perpendicular to the longitudinal axis of said pipe and parallel to the cross-sectional plane of said pipe, said pipe resting on both disks in each of the plurality of said paired disks.

21. The apparatus of claim 19 wherein said positioning means is comprised of a telescoping arm adjustable to traverse a path parallel to the longitudinal axis of said pipe.

22. The apparatus of claim 19 wherein said rotating means comprises a stationary bracket attached to said positioning means at one end thereof, a plurality of guide bearings on said bracket, and an arcuate member for holding said cutting means, said arcuate member inserted between said guide bearings and movable in an arcuate path by said third driving means.

23. The apparatus of claim 19 wherein said cutting means comprises a cutting torch.

24. The apparatus of claim 19 wherein said first driving means comprises a variable speed motor.

25. The apparatus of claim 19 wherein said second and third driving means comprise a second and third servo motor, respectively.

26. The apparatus of claim 19 wherein said second and third driving means comprise second and third stepping motors.

27. The apparatus of claim 19 wherein said controlling means comprises a computer having a random access memory for receiving the output from said input means and a read only memory for storing a program to calculate the desired cutting path.

28. The apparatus of claim 19 wherein said input means comprises a keypad for inputting characteristic data of said pipe and the desired cut.

29. An apparatus for cutting a pipe comprised of:
rotatable support means for supporting and rotating said pipe;
first driving means for rotating said support means;
first feedback means for sensing the angular rotation of said pipe;
positional means operable to traverse a path parallel to the longitudinal axis of said pipe;
second driving means for manipulating said positioning means;
second feedback means for sensing the position of said positioning means;
rotating means attached to said positioning means, said rotating means traversing an arcuate path in a plane parallel to and intersecting with the longitudinal axis of said pipe, the radial center of said arcuate path oriented towards the surface of said pipe;
third driving means for rotating said rotating means;
third feedback means for sensing the angular rotation of said rotating means;
cutting means attached to said rotating means, said cutting means in the same plane as said arcuate path, the operative end of said cutting means directed at the radial center of said arcuate path;
input means for inputting characteristic data of said pipe and the desired cut; and
controlling means for calculating the desired cutting path and cutting angle from the characteristic data and controlling said first, second and third driving means wherein the desired cutting path is continually calculated in response to the first, second and third feedback means to continually position the cutting means over the surface of said pipe along the cutting path and at selected angles to the surface of said pipe while said pipe is rotating.

30. The apparatus of claim 29 wherein said support means comprises a plurality of rotatable disks configured in two rows parallel to the longitudinal axis of said pipe wherein each row supports one half of the weight of said pipe.

31. The apparatus of claim 29 wherein said first feedback means is comprised of a sensing roller adjacent to said pipe and rotatable therewith.

32. The apparatus of claim 29 wherein said positioning means is comprised of a telescoping arm adjustable to traverse a path parallel to the longitudinal axis of said pipe.

33. The apparatus of claim 29 wherein said first driving means comprises a variable speed motor.

34. The apparatus of claim 29 wherein said second and third driving means comprise second and third stepping motors, respectively.

35. The apparatus of claim 29 wherein said second and third driving means comprise second and third servo motors, respectively.

36. The apparatus of claim 29 wherein said input means comprises:
a keypad for inputting characteristic data of said pipe and the desired cut, and
a plurality of transfer keys for transferring the input data from the keypad to a volatile memory.

37. The apparatus of claim 29 wherein said input means comprises a transfer means for transferring input data from nonvolatile storage to volatile storage.

38. The apparatus of claim 37 wherein said nonvolatile storage comprises a cassette tape.

39. The apparatus of claim 37 wherein said volatile storage comprises a random access memory.

40. The apparatus of claim 29 wherein said controlling means comprises a computer having a random access memory for receiving the output from said input means and a read only memory for storing a program for calculating the desired cutting path.

* * * * *